(12) United States Patent
D'Hulster et al.

(10) Patent No.: US 8,807,172 B2
(45) Date of Patent: Aug. 19, 2014

(54) METHOD AND DEVICE FOR REPAIRING PIPING

(71) Applicants: Gerald D'Hulster, Clearwater, FL (US); James Gould, Clearwater, FL (US)

(72) Inventors: Gerald D'Hulster, Clearwater, FL (US); James Gould, Clearwater, FL (US)

(73) Assignee: Perma-Liner Industries, LLC, Clearwater, FL (US)

( * ) Notice: Subject to any disclaimer, the term of this patent is extended or adjusted under 35 U.S.C. 154(b) by 0 days.

(21) Appl. No.: 13/753,655

(22) Filed: Jan. 30, 2013

(65) Prior Publication Data

US 2013/0139922 A1    Jun. 6, 2013

Related U.S. Application Data

(63) Continuation of application No. PCT/US2011/046164, filed on Aug. 1, 2011.

(60) Provisional application No. 61/369,457, filed on Jul. 30, 2010.

(51) Int. Cl.
*F16L 55/16* (2006.01)

(52) U.S. Cl.
USPC ............... 138/98; 138/97; 264/269; 264/516; 156/287

(58) Field of Classification Search
USPC ......... 138/98, 97; 264/269, 267, 516; 156/94, 156/294, 547; 405/150.1
See application file for complete search history.

(56) References Cited

U.S. PATENT DOCUMENTS

| | | | | |
|---|---|---|---|---|
| 5,393,481 A * | 2/1995 | Wood | | 264/516 |
| 5,950,682 A * | 9/1999 | Kiest, Jr. | | 138/98 |
| 6,039,079 A | 3/2000 | Kiest, Jr. | | |
| 6,482,280 B1 | 11/2002 | Kiest, Jr. et al. | | |
| 6,994,118 B2 * | 2/2006 | Kiest et al. | | 138/98 |
| 7,975,726 B2 * | 7/2011 | Kiest, Jr. | | 138/98 |
| 8,375,972 B2 * | 2/2013 | Kiest, Jr. | | 137/15.09 |
| 8,550,121 B2 * | 10/2013 | Kiest, Jr. | | 138/98 |
| 2005/0121092 A1 | 6/2005 | Kiest, Jr. et al. | | |
| 2011/0203719 A1 * | 8/2011 | Kiest, Jr. | | 156/94 |
| 2011/0259461 A1 * | 10/2011 | Kiest, Jr. | | 138/97 |
| 2011/0277864 A1 * | 11/2011 | Kiest, Jr. | | 138/98 |

FOREIGN PATENT DOCUMENTS

EP    1426671 A1    9/2004

OTHER PUBLICATIONS

Perma-Liner Industries, Inc. et al, PCT/US2011/046164, "Notification of Transmittal of the International Search Report and the Written Opinion of the International Searching Authority, or the Declaration", date of mailing Mar. 28, 2012.

* cited by examiner

*Primary Examiner* — Patrick F Brinson
(74) *Attorney, Agent, or Firm* — McKee, Voorhees & Sease

(57) ABSTRACT

A device and method for repairing the junction of a main pipe line and a lateral pipe. The device uses a series of independently controlled bladders to adjust the timing and pressure exerted by the bladders on the pipes. The device also uses a liner assembly of resin absorbent material is formed, with a tubular lateral liner connected to a concentric circular main liner. The liner also includes an opening to facilitate loading of the liner in the device. Upon loading the bladders and resin-embedded liner into a train, the device is positioned and the bladders independently inflated, either concurrently or in sequence, installing the liner assembly onto the pipe. Once the resin is cured, the bladder assembly and launcher are removed from the sewer pipe.

17 Claims, 14 Drawing Sheets

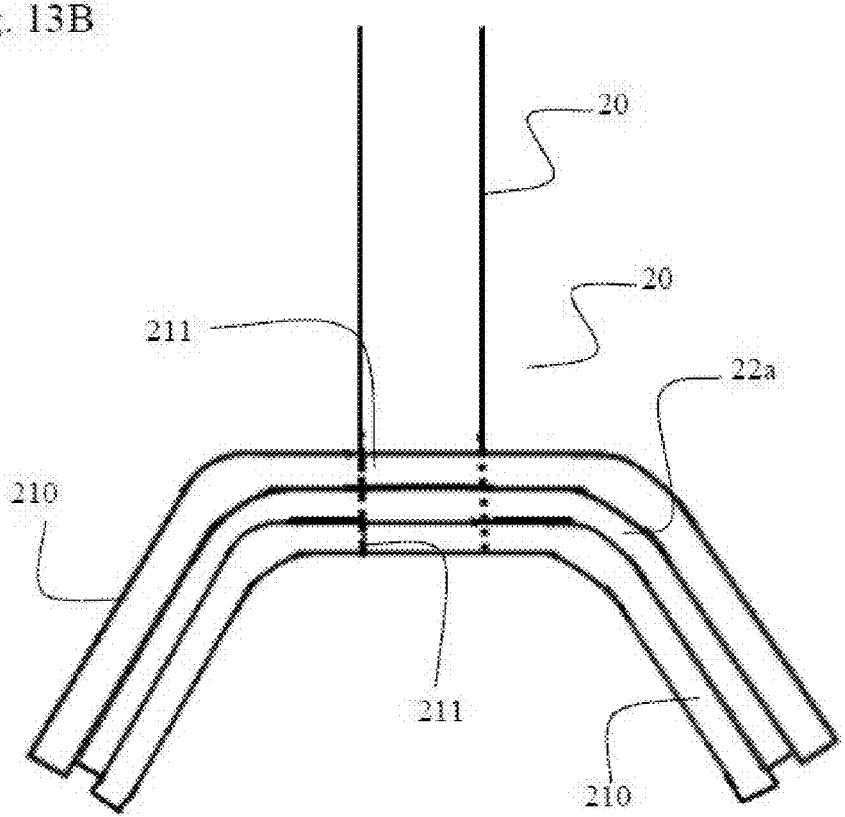

METHOD AND DEVICE FOR REPAIRING PIPING

CROSS REFERENCE TO RELATED APPLICATIONS

This application is a continuation application of U.S. PCT/US2011/046164 filed Aug. 1, 2011, which claims priority to U.S. Provisional Application No. 61/369,457, filed Jul. 30, 2010, all of which are incorporated herein by reference in their entirety.

FIELD OF INVENTION

This invention relates to pipeline and duct liners, using what is known as a "cured in-place" method. More specifically, the invention provides a novel method and device for applying resin-impregnated pipe liner to a main pipeline-branch pipeline juncture.

BACKGROUND OF THE INVENTION

Broken pipes, such as sewer pipe, has traditionally been repaired by excavating the area surrounding the sewer pipe and replacing the damaged section. This is a very expensive and labor intensive solution, and is also an inconvenience to residents living in the area and utilizing roadways overlying the area. An alternative method repairs the pipe in situ, without the site excavation of the traditional method. These "cured-in-place" systems typically utilize a resin coated liner which is inserted into the existing sewer pipe line and fitted against the interior of the sewer pipe. Such methods have been used very successfully for many years, as exemplified by Wood (U.S. Pat. No. 4,009,063); Wood (U.S. Pat. No. 4,064,211); Wood (U.S. Pat. No. 4,366,012); and Taylor (U.S. Pat. No. 5,927,341).

These patent typically envisaged long, straight lengths of main pipes will be lined, but do not address sections containing side or branch pipes. When a lining is applied along a main sewer as described, the tubular structure will cover the lateral connections and these subsequently have to be reopened by the cutting away of coupons of the rigid lining in register with the lateral connections. In many cases it is the connection between the main pipe and branch pipe which causes the greatest problem, as the joint is weak due to the method of initially forming the branch and the difficulty in repairing the joint. The present invention seeks to provide a method to install cured-in-place liner which addresses the difficulties existing at present.

SUMMARY OF THE INVENTION

The cured-in-place repair method and device allow for an in situ repair. The present cured-in-place system comprises two independent bladders, a lateral pipe bladder and a main pipe bladder, with two air lines, one for the main bladder and one for the lateral bladder. As damage to the pipes results in weakened pipes, high inflation pressures may result in a "blow out" of the pipe, thereby destroying the remaining pipe body and preventing any in-pipe repair. The pressure exerted by the lateral pipe bladder can be modulated independently of the main pipe bladder, which may be of significant concern in repairing damaged pipes and aging fragile pipes. Thus, the main bladder may provide sufficient pressure to pin the liner ring to the main pipe while the lateral bladder gently deploys into the lateral pipe.

The device for repairing a junction of a main line pipe and a lateral pipe, uses a repair train having a first end and a second end, at least one wall disposed between the first end and second end, an interior lumen defined by the at least one wall and the first end and second end, and an opening in the at least one wall disposed between the first end and second end. The train optionally includes a plurality of shackles on the front of the repair train to allow the train to attach to other devices, such as a robotic tractor.

In specific embodiments of the invention, the train is a tubular structure. A main bladder tube is disposed on the exterior of the repair train. The main bladder tube has a first end and a second end, with a lateral tube opening between the first end and second end. A lateral bladder tube is disposed in the interior of the repair train and adjacent to the lateral tube opening. A main bladder inflation tube and lateral bladder inflation tube are attached to the main pipe bladder and lateral pipe bladder, respectively. The inflation tubes may attach by any means known in the art, such as quick release connectors, screw connectors, a fused inlet, and a valved inlet.

The device may also include a liner, such as a main pipe liner, a lateral pipe liner, or a junction repair liner. The specific embodiments, the junction repair liner includes a tubular structure with a concentric ring attached to one end of the tube. The concentric ring may be fused to the tube. The junction repair liner may also include an opening on the wall of the tube opposite the end having the concentric circle. The liners may include a resin absorbent material, such as felt, fiberglass, non-woven felt, or polyester knitted fabric; and a support material known in the art. Exemplary support materials include polymer coatings, such as polyvinyl chloride, polyurethane, or polypropylene.

The bladders may be made of any known, robust inflatable material such as a reinforced silicone, rubber, urethane scrim, vinyl, polyurethane, XR-5®, XR-3 PW, polyethylene & polypropylene, EPDM, Kevlar®, neoprene, nitrile, nylon, polyester, polyvinylchloride. In specific embodiments, the bladders are tubular bladders, having a non-pressurized interior lumen.

It is preferred that the resin should be of the ambient cure type which means that it will cure with the passage of time, which may be quite short, a matter of an hour or two, so that no external curing initiation means is required. It is of course possible to use resins which require cure initiation such as heat cure resins, light cure, ultrasonic and so on, but when other than ambient cure resin is utilized, extra means must be provided on site for initiating the cure which increases the cost of the process.

The pipe repair method uses a repair device. The repair device has a repair train, having a first end and a second end, at least one wall disposed between the first end and second end, and an interior lumen. In an exemplary embodiment, the train is a shaped as a tube. The train has an opening in at least one wall. A lateral pipe bladder is inserted into the train, adjacent to the opening. A lateral bladder tube inflation tube is then connected to the lateral bladder, permitting a fluid, such as compressed air, to flow into the lateral bladder. A main bladder, with a lateral bladder opening, is then placed on the exterior of the repair train and a main bladder inflation tube attached to the bladder. The device is ready for insertion of the repair liner, which may occur at this point, or just prior to repair. The repair liner is soaked in resin and inserted through the lateral bladder opening and into the lumen of the lateral bladder.

The device is then positioned at the damaged pipe location by means known in the art. In exemplary embodiments, a robot is used to position the repair train. Once in location, the bladders are inflated. Advantageously, the invention allows the main pipe bladder and lateral pipe bladders to be inflated independent of each other. For example, air may be applied through the main bladder inflation tube and subsequently the lateral bladder inflation tube; or air applied through the lateral bladder inflation tube and subsequently the main bladder inflation tube, or are applied concurrently through the main bladder inflation tube and the lateral bladder inflation tube. Furthermore, the pressure of each bladder may be modulated independently of the other bladder.

The inflated later bladder reverts, rolling the liner onto the pipe. The inflated bladders apply pressure on opposite sides of pipe, pressing the liner against the pipe and allowing the resin to cure. The inflation assembly is then deflated, and the lateral bladder inverted into the inside of the repair train. The device, with deflated bladders, are then removed from the lining, now bonded to the pipe junction.

BRIEF DESCRIPTION OF THE DRAWINGS

For a fuller understanding of the invention, reference should be made to the following detailed description, taken in connection with the accompanying drawings, in which:

FIG. 13B is a side diagrammatic view of a lateral bladder for use with the lateral bladder cuff of FIG. 9 having a pair of silicon sleeves.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
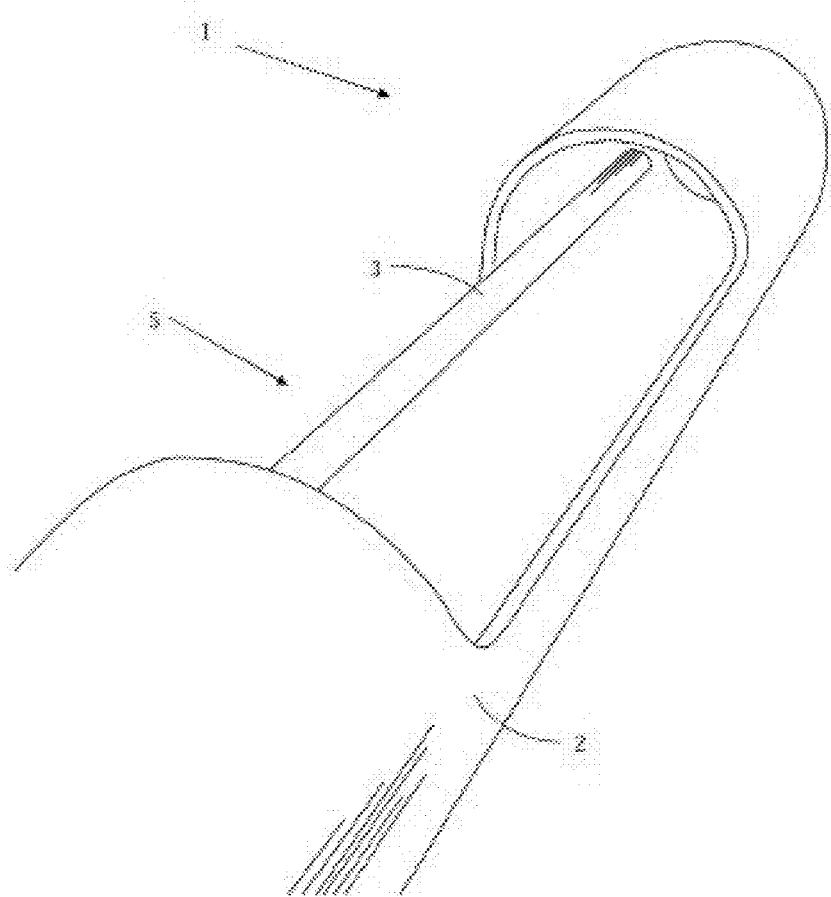
FIG. 1 is an isometric view of the repair train, looking from the front end of the train to the back section.
Figure 2:
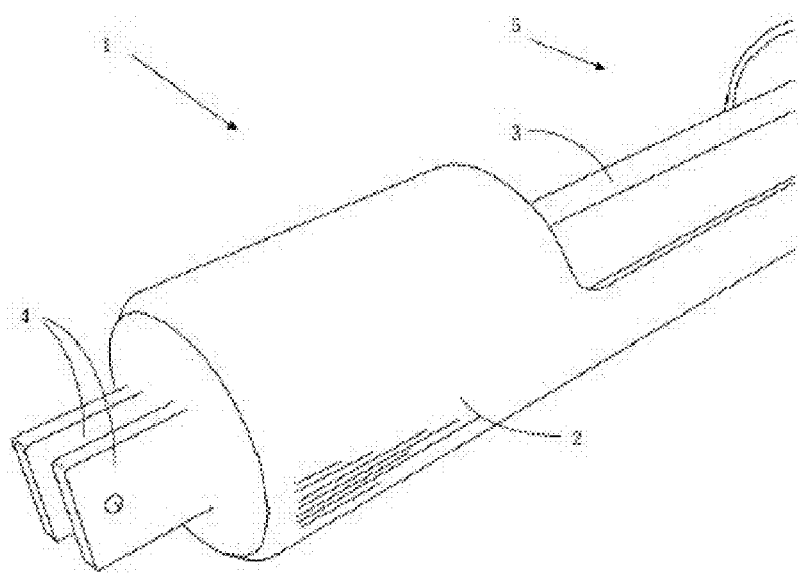
FIG. 2 is an isometric view of the front of the repair train, showing the shackles used to connect the repair train to a robot.

A repair train is used to carry the bladders and resin-coated liner to the pipe repair location. Repair train 1 is a tube having a rectangular inflation opening 5 disposed in the middle of repair train 1, as seen in FIG. 1. Repair train wall 2 provides an interior lumen of the repair train. Accessory tube 3 runs along the length of repair train wall 2 and houses air tubes, cameras, electrical cords, and other accessories, thereby keeping the accessories from entangling the bladders and liners. One end of the repair train is open, while the second end is closed, as seen in FIG. 1. A set up shackles 4 are joined to the second end, allowing a robot to attach to the repair train and carry the device to the repair site, seen in FIG. 2.

Figure 3:
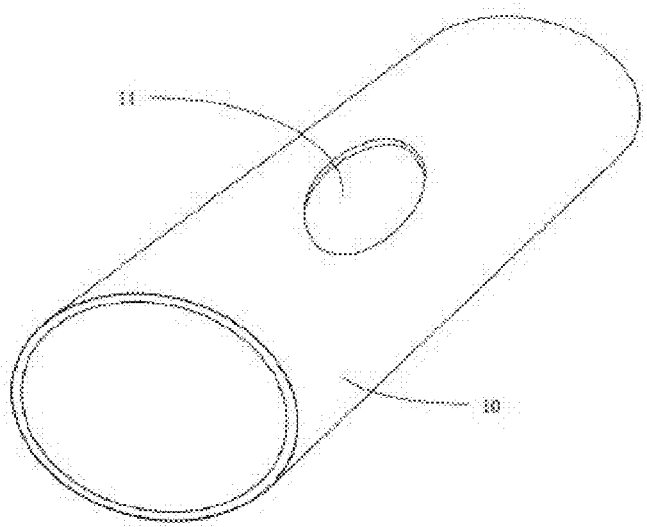
FIG. 3 is an isometric view of the main pipe repair bladder. The lateral pipe opening is visible in the center of the main pipe bladder.

Main pipe bladder 10 is a tubular structure having a circular, lateral tube opening 11 disposed between the two ends of the main pipe bladder, as seen in FIG. 3. Main pipe bladder 10 is of sufficient size to fit snugly around the exterior of repair train wall 2. Main pipe bladder inflation tube 12 has a quick release that locks with a quick release on main pipe bladder 10. Alternatively, main pipe bladder inflation tube 12 is fused with main pipe bladder 10. The main bladder is made from rubber, polyvinyl chloride, polyurethane, polypropylene, or silicon type of materials.

Figure 4:
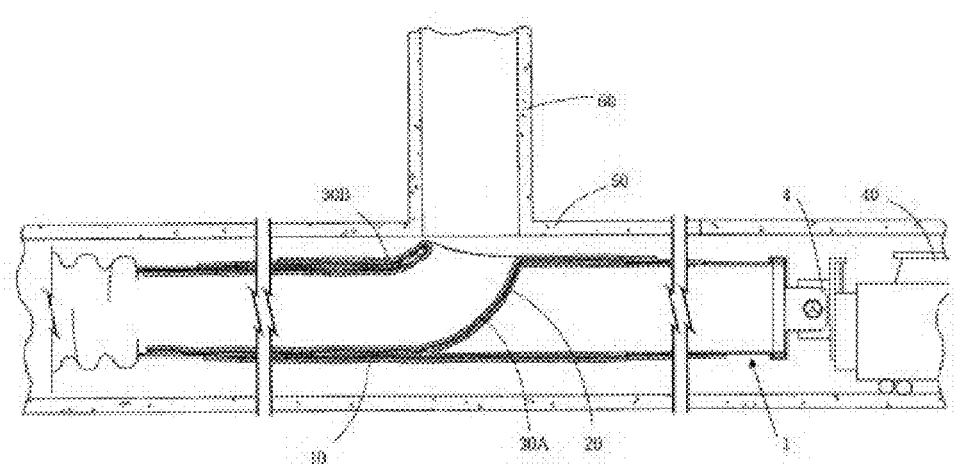
FIG. 4 is a cross-section view of the liner and repair device assembly inserted in a pipe line. The image shows that repair device positioned at a junction for repair.

Lateral pipe bladder 20 is a tubular structure having a first open end 21A and a second closed end 21B, FIG. 4. The lateral pipe bladder is of sufficient diameter and adapted to fit through lateral tube opening 11. Lateral pipe bladder inflation tube 22 connects with the first end of lateral pipe bladder 20 using a quick release or is alternatively fused to the second end of lateral pipe bladder 20. The second end of main pipe bladder inflation tube 12 and second end of the lateral pipe bladder inflation tube 22 each connect to a compressor, or other source of air, such that the main bladder and lateral bladder may be inflated separately.

The device must be assembled prior to use. Second closed end 21B of lateral bladder tube 20 is inverted and placed in the interior lumen of repair train 1. Lateral pipe bladder inflation tube 22 is run through accessory tube 3 and attached to lateral bladder tube 20. Power cables and other accessory lines and cables can be run through accessory tube 3 at this time. Main pipe bladder 10 is slid around the exterior of repair train wall 2, with lateral tube opening 11 disposed over rectangular inflation opening 5. In specific embodiments, lateral bladder tube 20 is attached to main pipe bladder 10, such as by clips, snaps, or other attachment known in the art. Main pipe bladder inflation tube 12 is then slid through accessory tube 3 and attached to main pipe bladder 10. In specific variations, the lateral pipe bladder is band clamped to the interior of repair train wall 2 using rubber sleeves.

The rubber sleeves fit between the lateral pipe bladder and the repair train wall to create an air tight fit. Main pipe bladder 10 is positioned over lateral pipe bladder 20 and repair train 1, thereby positioning the opening of lateral pipe bladder 20 adjacent to lateral tube opening 11. Main pipe bladder 10 is secured to repair train wall 2 using banding clamps at each end of the main bladder.

Figure 5:
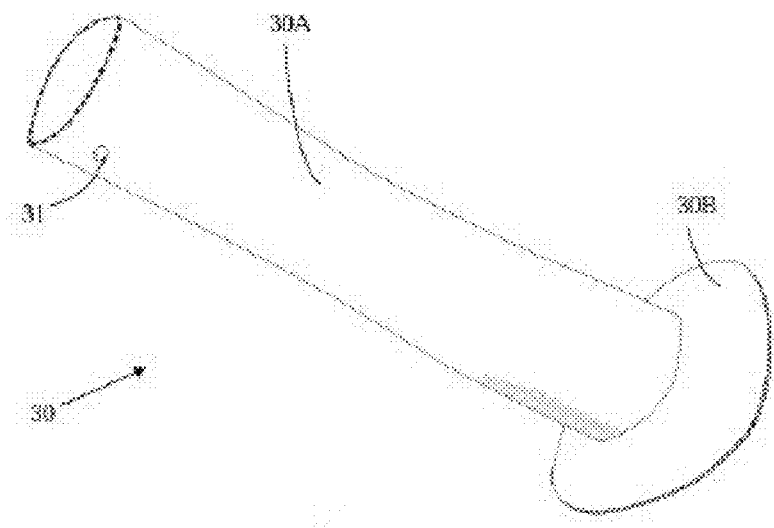
FIG. 5 is an illustration of one embodiment of the liner used in the present invention. The illustrated liner is particularly useful in junction repair, where the main pipe liner covers the area surrounding the junction.

T-shaped liner 30 is made of felt or other resin-absorbent material. In specific variants of the liner, a polymer coating is fused to the exterior of the felt tube. Edges of the liner are sewn together at a seam, and a strip of polymer tape welded over the seam to form an airtight seal. The liner is prepared for insertion into the device. As seen in FIG. 5, the t-shaped liner 30 has a lateral liner subunit 30A with insertion eye 31 disposed on the one end of lateral liner subunit 30A. The second end of the lateral liner subunit is attached to a main liner subunit 30B, such as a ring of liner material. T-shaped liner 30 is soaked in resin. Exemplary resins include polyester, which is useful for sewer applications, vinyl ester, which is useful in industrial, waste, and sewer applications and specifically used for pressurized pipe, and epoxy, which is useful for pressurized and/or high temperature applications. Insertion hook 32 is inserted into insertion eye 31, and the insertion hook is used to slide lateral liner subunit 30A through lateral tube opening 11, and into lateral pipe bladder 20.

Figure 6:
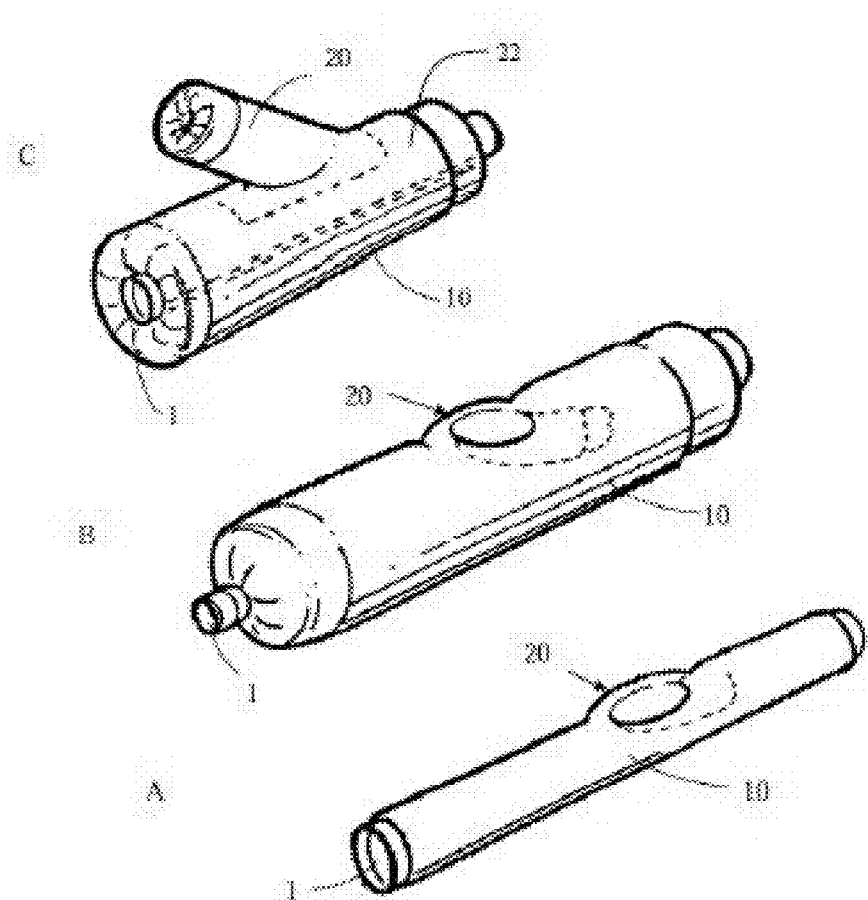
FIGS. 6(A)-(C) are images showing perspective views of the main pipe bladder and lateral pipe bladder being inflated. (A) The bladders are deflated and collected around the repair train. (B) The main pipe bladder has been inflated against the main pipe, with the lateral pipe bladder still deflated. (C) The lateral pipe bladder is inflated, completing the inflation sequence.
Figure 7:
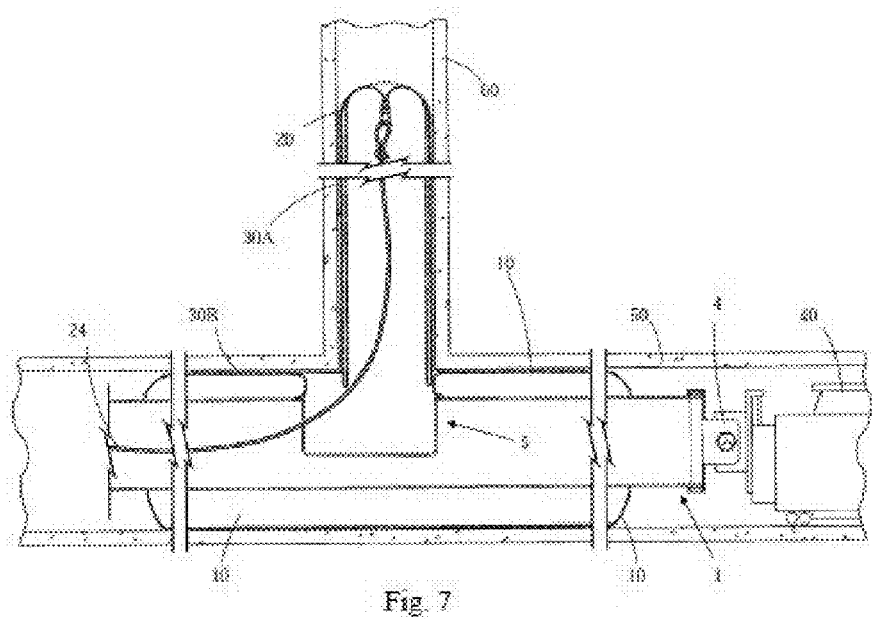
FIG. 7 is a cross-section view of the liner and repair device in the pipe line, with the bladders inflated and the liner applied to the pipe.

A positioning robot 40 is then attached to shackles 4 of repair train 1, as seen in FIG. 4. Accessory lines are attached to the robot and the system introduced into the sewer main line 50, to the damaged pipe. Once at the damaged pipe, the robot positions the repair train such that the lateral liner opening 5 is aligned with lateral pipe 60 and the damaged pipe. Once positioned, air pressure is applied through main pipe bladder inflation tube 12, thereby inflating main pipe bladder 10, seen in FIG. 6. Once the main pipe bladder is inflated against the walls of main pipe 50, air pressure is applied to lateral pipe bladder inflation tube 22, inflating lateral pipe bladder 20. As lateral pipe bladder 20 inflates, the lateral pipe bladder re-verts into the lateral pipe, pressing t-shaped liner 30 against the wall of the lateral pipe, as seen in FIG. 7. While the inflated bladders are shown T-shaped, it is envisioned that main pipe bladder 10 and lateral pipe bladder 20 may also a Y-shape or other shape as needed to accommodate the angle at which the main sewer pipe and lateral sewer pipe are disposed relative to one another.

The air pressure continues to apply pressure against the liner, radially outward against the pipe until the resin in the liner has cured. Once cured, the liner has joined with main pipe 50 and lateral pipe 60 to provide a seal. The air pressure in the bladders is reduced, causing the bladders to deflate. Alternatively, lateral bladder retractor 24 is used to withdraw lateral pipe bladder 20 from lateral pipe 60, facilitating quick removal of the device. The robot is then used to remove the device from the pipe.

Improved Repair Train

Figure 8:
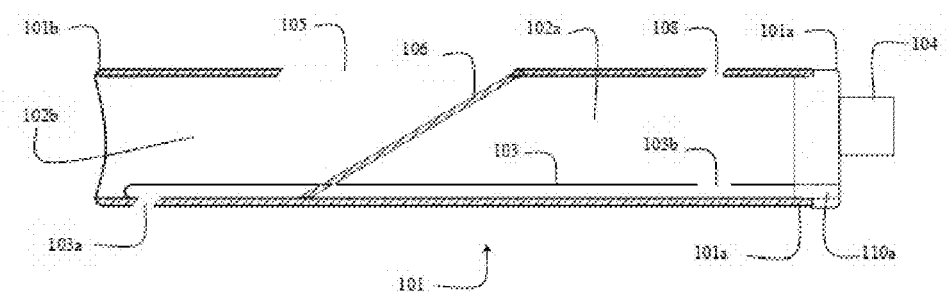
FIG. 8 is a side cross-sectional view of an improved repair train.
Figure 9:
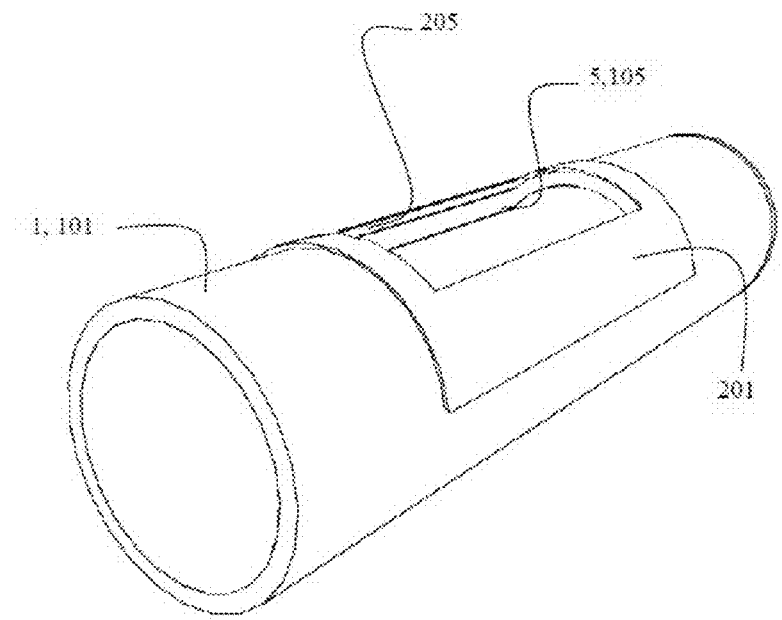
FIG. 9 is a perspective view of a repair train with a lateral bladder cuff installed thereon.

In another embodiment the invention includes an improved repair train that is used to carry the bladders and resin-coated liner to the pipe repair location. As shown in FIGS. 8 and 9, repair train 101 is a tube having leading end 101a, trailing end 101b and substantially rectangular inflation opening 105 disposed in the middle thereof. Ramp 106 extends at a downward angle from the leading end of opening 105 toward trailing end 101b Inner train wall 102a provides a leading interior lumen of the repair train, whereas train wall 102b provides a trailing interior lumen of the repair train. The leading and trailing lumens are separated by ramp 106 which forms a substantially air-tight seal.

Accessory tube 103 runs along the length of repair train wall 102a and 102b, and houses air tubes, cameras, electrical cords, and other accessories, thereby keeping the accessories from entangling the bladders and liners. Accessory tube 103 passes through ramp 106 but a seal is formed to ensure the seal between the leading and trailing lumens is maintained.

Trailing end 101a of the repair train is open, while leading end 101b is closed by end cap 110. A set of shackles 104 extend from end cap 110, allowing a robot to attach to the repair train and carry the device to the repair site. Port 111 allows the necessary electrical and camera cords to pass from accessory tube 103 through end cap 110 to the exterior of the repair train.

Repair train 101 has a first port 103a formed on its lower side to allow the air tubes, cameras, electrical cords, and other accessories to enter accessory tube 103. These accessories travel down the tube, pass through ramp 106 and into accessory tube 103 the leading lumen of the repair train. A second port 108 in the upper surface of repair train 101 allows an air hose to be drawn through first port 103a, along the length of accessory tube 103, out through egress 103b and finally through port 108 where it can be connected to main pipe bladder 10.

With this configuration, no air pressure is lost to the leading lumen of the repair train. Moreover, the majority of accessories, tubes and wiring can be attached to the same end of the repair train.

Lateral Bladder Retaining Cuff

Yet another aspect of the invention includes retaining cuff 201, shown in FIGS. 9 through 12. As shown in FIG. 9 the invention includes retaining cuff 201 which fits over repair train 1, 101. Cuff 201 is substantially semi-tubular with a rectangular inflation opening 205 disposed in the middle thereof. Cuff opening 205 mates with inflation opening 5, 105 in repair train 1, 101. Preferably cuff 201 is made of a strong material and fits into place over train 1, 101. Preferably, the lower extents of the cuff providing sufficient biasing inward force as not to be easily dislodged. Cuff 205 is preferably secured to train 1, 101 by conventional means such as mechanical fasteners.

Figure 10:
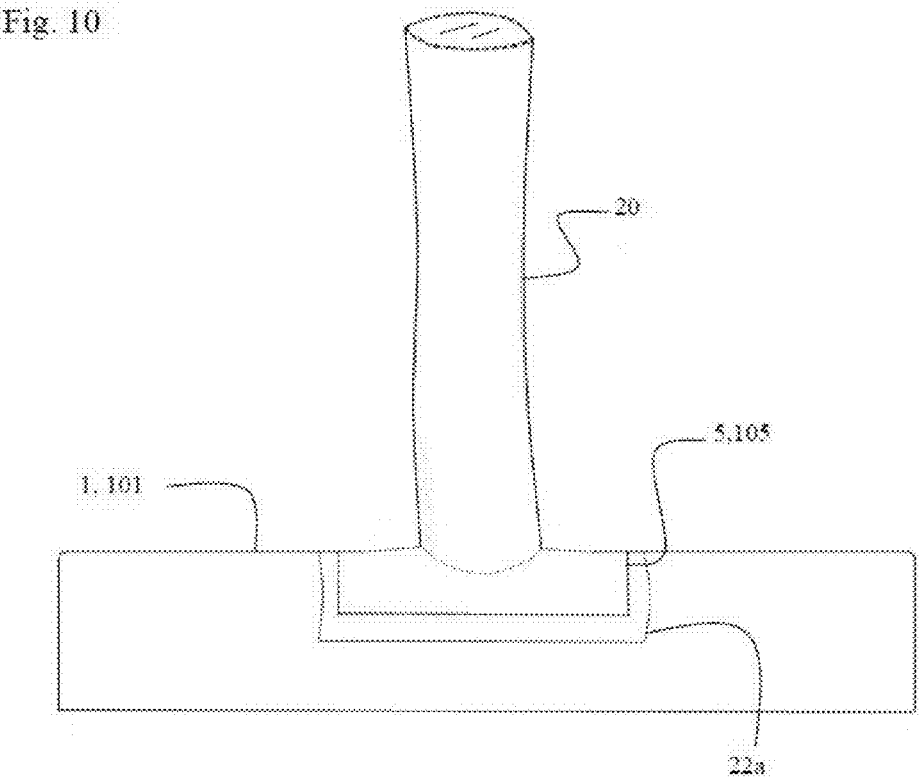
FIG. 10 is a side diagrammatic view of a repair train with a lateral inflation bladder for use with the lateral bladder cuff of FIG. 9.
Figure 11:
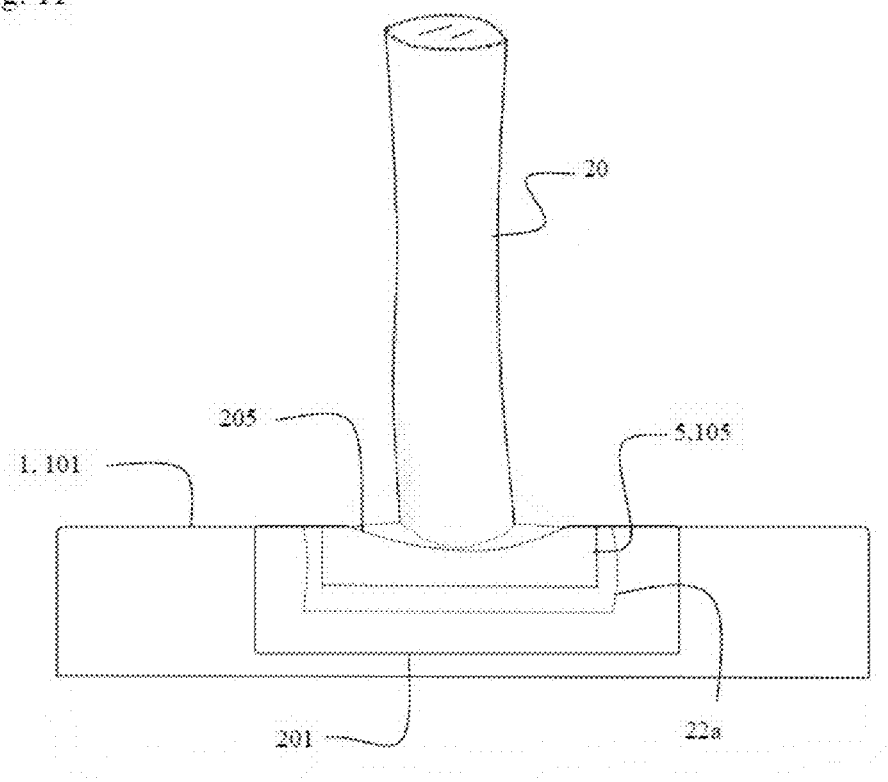
FIG. 11 is a side diagrammatic view a repair train with a lateral inflation bladder with the lateral bladder cuff of FIG. 9 installed thereon.
Figure 12:
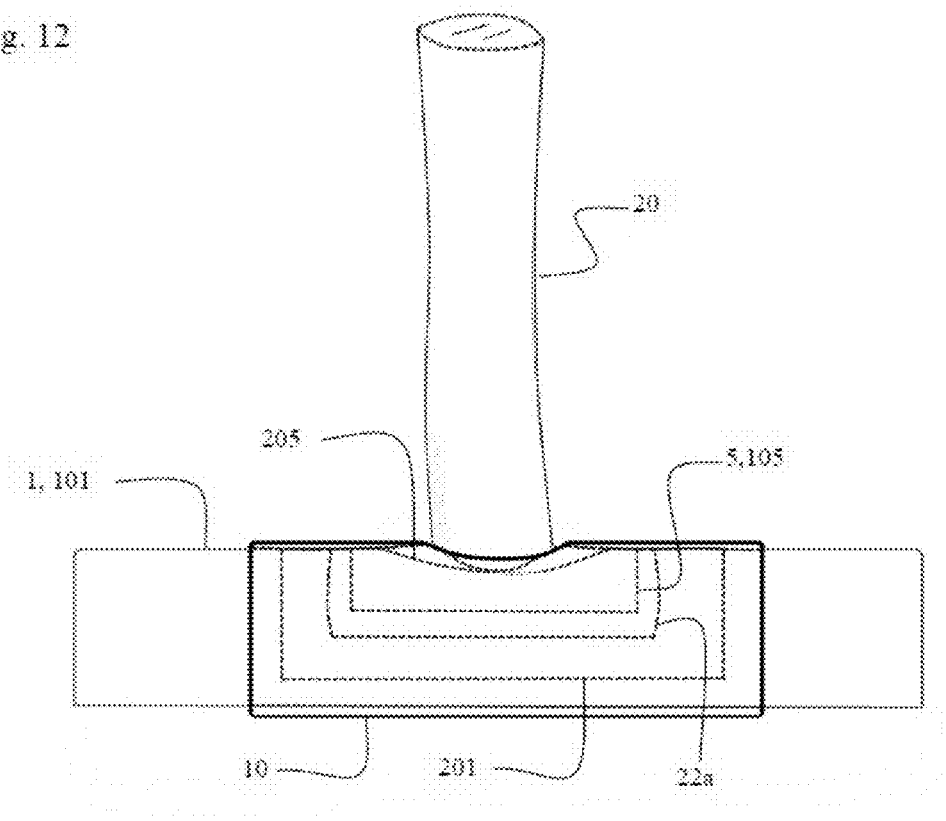
FIG. 12 is a side diagrammatic view a repair train with a lateral inflation bladder with the lateral bladder cuff of FIG. 9 and main bladder installed thereon.

In use, a modified lateral pipe bladder 20 is employed. In this embodiment, as shown in FIGS. 10 through 12, lateral pipe inflation tube 22 is replaced by Anchor portion 22a. Anchor portion 22a, in a first embodiment, comprises a plurality of flaps extending from one end of lateral pipe inflation tube 22. In another embodiment, anchor portion 22a is a concentric ring attached to (and extending radially from) one end of lateral pipe inflation tube 22. Anchor portion 22a, in both embodiments, is place in overlying relation to inflation opening 5, 105. Referring now to FIG. 10, lateral bladder tube 20 is passed through opening 205 in cuff 201 and the cuff is snapped into place over train 1, 101. Cuff 201 is then secured using adhesives or mechanical fasteners if needed.

In FIG. 12, main bladder 10 is position over cuff 201 and lateral bladder 20. Lateral bladder 20 can be fed through opening 11 in main bladder 10, or can be inserted into the interior of train 1, 101 prior to positioning main bladder 10. The lateral lining material is then positioned as described above.

Main bladder 10 is inflated after the lateral bladder is aligned with the lateral tube, as described above. In addition to providing a biasing force against the sides of the main pipe, main bladder 10 also biases cuff 201 (and by extension anchor portion 22a) even more firmly against train 1, 101. This maintains an air-tight seal when lateral bladder 20 is inflated. In some embodiments, main bladder 10 is inflated at a greater pressure than lateral bladder 20 to ensure no air pressure is lost.

Figure 13A:
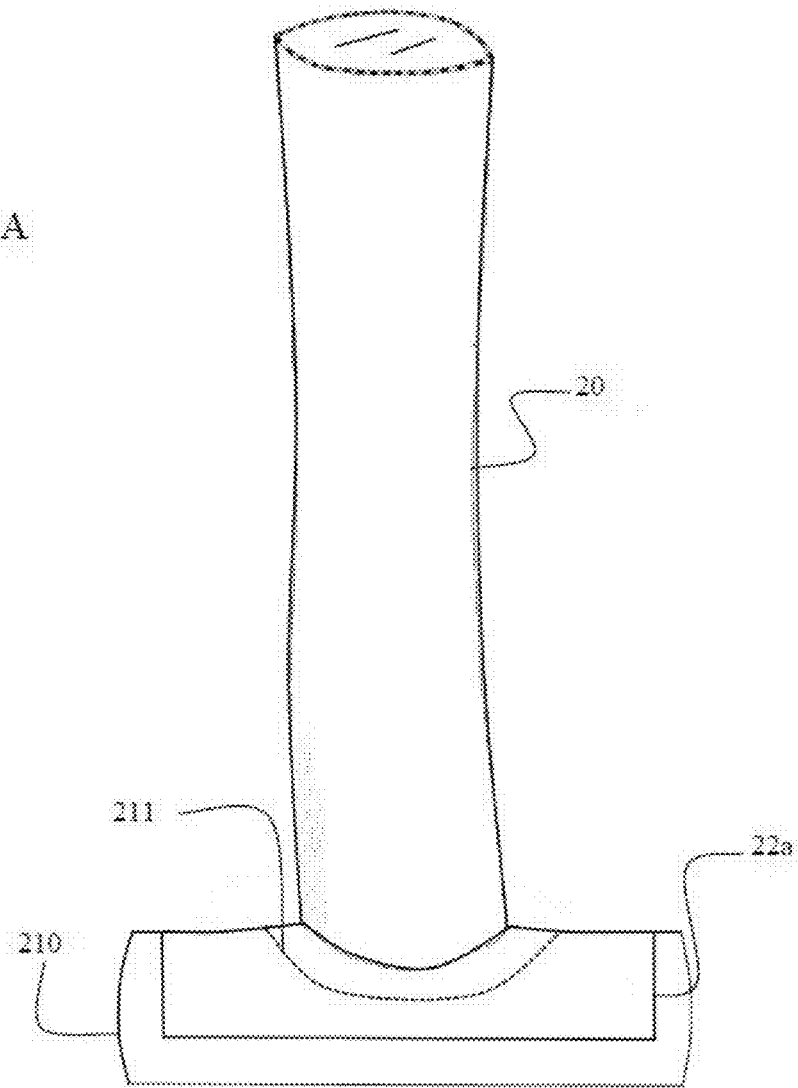
FIG. 13A is a side diagrammatic view of a lateral bladder for use with the lateral bladder cuff of FIG. 9 having a single silicon sleeve.

In alternative embodiments, shown in FIGS. 13A and 13B an additional silicon layer is added to ensure the air-tight seal is maintained. In first of these embodiments a silicon layer 210 having opening 211 is added between anchor portion 22a and train 1, 101 (FIG. 13A). The second of these embodiments, anchor portion 22a is sandwiched between two layers (210a and 210b).

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method for repairing a damaged junction between a main line sewer pipe and a lateral sewer pipe, said method comprising:
    forming a main bladder tube having first and second opposite ends and a main bladder tube opening there between;
    forming a lateral bladder tube having an anchor portion extending radially from one end;
    forming a main liner member and a lateral liner tube of resin absorbent material, said main liner member having a main liner opening therein, said lateral liner tube having a first lateral liner tube end connected to said main liner opening;
    inserting said lateral bladder tube at least partially inside a launcher tube through a launcher tube opening in said launcher tube while at the same time keeping said anchor portion at least partially outside of said launcher tube;
    affixing a substantially semi-tubular repair cuff, having a repair cuff opening therein, to said launcher tube with said anchor portion secured there between;
    positioning said main bladder tube over said repair cuff and said launcher tube such that the main bladder tube opening is aligned with said repair cuff opening and said launcher tube opening;
    inserting said lateral liner tube through said main bladder tube opening and said repair cuff opening into the interior lumen of the lateral bladder tube while at the same time keeping said main liner member at least partially outside said main bladder tube.

2. The method according to claim 1, further comprising:
    pressing said main liner member radially outwardly against said main line pipe;
    inverting said lateral bladder tube and said lateral liner tube out of said launcher tube into said lateral pipe with said lateral liner tube being outside said lateral bladder tube;
    pressing said lateral liner tube radially outwardly against said lateral line pipe;
    permitting said curable resin to cure and harden, and removing said launcher tube, said main bladder tube, and said lateral bladder tube from said main line sewer pipe.

3. The method of claim 2, further comprising:
    connecting the main bladder tube to a first source of compressed fluid; and
    connecting the lateral bladder tube to a second source of compressed fluid.

4. The method of claim 3, wherein the main liner member is pressed against said main line pipe prior to inverting said lateral bladder tube.

5. The method of claim 3, wherein the main liner member is pressed against said main line pipe by inflating said main bladder tube.

6. The method of claim 3 wherein the lateral bladder tube is inverted out of said launcher tube by applying fluid pressure to the interior of said launcher tube.

7. The method of claim 3 wherein the lateral liner tube is pressed against the lateral line pipe by applying fluid pressure to the interior of said launcher tube and said lateral bladder tube.

8. The method of claim 1, wherein the anchor portion is a concentric ring extending radially from one end of the lateral bladder tube.

9. The method of claim 1, wherein the anchor portion is a plurality of flaps extending from one end of the lateral tube.

10. The method of claim 1, wherein the anchor portion is a tube constructed from a substantially non-expanding material.

11. The method of claim 1, wherein the repair cuff is affixed to the launcher tube by mechanical fasteners extending through the repair cuff and anchor portion and into the launcher tube.

12. An apparatus for repairing a damaged junction between a main line sewer pipe and a lateral sewer pipe, comprising:
    an elongated substantially tubular body having an open first end and a closed second end, and a first side and a second side;
    a lateral inflation opening disposed in the first side of the substantially tubular body;
    a wall extending at a downward angle from the inflation opening to the second side of the substantially tubular body thereby forming a first interior chamber and a second interior chamber within the substantially tubular body; and
    an access tube extending at least partially within the tubular body;
    whereby the open first end of the substantially tubular body is in open fluid communication with the inflation opening through the first interior chamber.

13. The apparatus of claim 12, wherein the access tube comprises a first end and a second end, and a first side and a second side, the access tube extending substantially along the length of the substantially tubular body along the second side of the substantially tubular body.

14. The apparatus of claim 13 wherein the tube passes through the downward extending wall.

15. The apparatus of claim 13, further comprising a first access aperture extending through the second side of the substantially tubular body and access tube near the first ends thereof.

16. The apparatus of claim 15, further comprising a second access aperture extending through the first side of the access tube near the second end thereof providing communication between second interior chamber and the first access aperture.

17. The apparatus of claim 12, further comprising a main inflation opening in the first side of the substantially tubular body in fluid communication with the second interior chamber.

* * * * *